United States Patent
Darby

(10) Patent No.: US 7,589,483 B2
(45) Date of Patent: Sep. 15, 2009

(54) MOTOR CONTROL

(75) Inventor: Adam John Darby, Auckland (NZ)

(73) Assignee: Fisher & Paykel Applicances Limited, Auckland (NZ)

( * ) Notice: Subject to any disclaimer, the term of this patent is extended or adjusted under 35 U.S.C. 154(b) by 31 days.

(21) Appl. No.: 11/759,614

(22) Filed: Jun. 7, 2007

(65) Prior Publication Data

US 2008/0303463 A1 Dec. 11, 2008

(51) Int. Cl.
*H02P 6/22* (2006.01)
*D06F 33/00* (2006.01)
*H02K 7/14* (2006.01)
*H02P 6/14* (2006.01)

(52) U.S. Cl. .................. 318/400.14; 318/245; 318/254; 68/12.16

(58) Field of Classification Search ......... 318/800–818; 8/158
See application file for complete search history.

(56) References Cited

U.S. PATENT DOCUMENTS

| | | | | |
|---|---|---|---|---|
| 4,271,380 A | * | 6/1981 | Bradler et al. | 318/245 |
| 4,672,286 A | * | 6/1987 | Williams | 318/798 |
| 4,857,814 A | * | 8/1989 | Duncan | 318/281 |
| 5,341,452 A | * | 8/1994 | Ensor | 388/811 |
| 5,398,298 A | * | 3/1995 | Ensor | 388/811 |
| 5,821,708 A | | 10/1998 | Williams et al. | |
| RE37,360 E | * | 9/2001 | Duncan | 318/281 |
| 2007/0050917 A1 | * | 3/2007 | Kim et al. | 8/158 |
| 2007/0152624 A1 | * | 7/2007 | Hamaoka et al. | 318/805 |

FOREIGN PATENT DOCUMENTS

| | | |
|---|---|---|
| NZ | 228501 | 9/1985 |
| NZ | 211214 | 4/1989 |
| NZ | 236541 | 12/1990 |

* cited by examiner

*Primary Examiner*—Paul Ip
(74) *Attorney, Agent, or Firm*—Trexler, Bushnell, Giangiorgi, Blackstone & Marr, Ltd.

(57) ABSTRACT

A washing machine and a method of operating same is disclosed. A electronically commutated motor for using in a washing machine is also disclosed. The washing machine has an agitator operated by an electronically commutated motor. An agitate cycle of the washing machine is detected. During an agitate cycle, the motor is electronically commutating with two phase firing if the agitator is rotating at rate below a first threshold, or the motor is electronically commutating using an optimised firing angle with three phase firing if the agitator is rotating at rate above a first threshold.

18 Claims, 9 Drawing Sheets

MOTOR CONTROL

FIELD OF THE INVENTION

The present invention relates to the control of motors, and in particular, but not solely, the control of electronically commutated motors for washing machines.

BACKGROUND TO THE INVENTION

Motors are used to drive the spin baskets and/or agitators of washing machines in order to wash clothing that is in the spin basket. There are many phases of the motor operation corresponding to different phases in the wash cycle. One part of the wash cycle is an agitate cycle whereby the agitator is oscillated backwards and forwards in order to agitate clothing in the spin basket.

The motor used to operate the agitator can be of the electronically commutated inside-out type permanent magnet rotor, or brushless DC motor. The stator of the motor is fixed to the underside of the bowl and/or is coupled to the agitator. The stator has a number of radially aligned poles extending outwardly from a hub. The poles each carry a winding, and every third winding is connected to form a total of three windings in the stator. The electronic commutator can energise the windings in turn, in order to rotate the rotor in the desired manner.

Traditionally, a two phase firing regime is used to energise the windings in an electronically commutated motor. In two phase firing, at any point in time two of the windings are energised, with the third winding remaining un-energised or floating. With two phase firing, the maximum torque capability of the motor decreases above a particular speed threshold. This can reduce effectiveness of the motor, and the effectiveness of washing, when used in a washing machine.

SUMMARY OF INVENTION

It is an object of the present invention to provide an improved motor and/or method for operating a motor.

In one aspect the invention may be said to consist in a method of operating a washing machine with an agitator operated by an electronically commutated motor comprising three stator phases, the method comprising the steps of: detecting an agitate cycle of the washing machine, and during an agitate cycle: electronically commutating the motor with two phase firing if the agitator is rotating at rate below a first threshold, electronically commutating the motor with three phase firing if the agitator is rotating at rate above a first threshold, wherein the step of electronically commutating the motor with three phase firing comprises using an optimised firing angle.

Preferably, electronically commutating the motor with three phase firing comprises operating the three stator phases in a plurality of stages, wherein each stage comprises the steps of: applying an excitation voltage to one of the stator phases, and applying a reference voltage to the other two stator phases.

Preferably, for each stage an excitation voltage and reference voltages are applied to different combinations of stator phases.

Preferably, the electronically commutated motor comprises aluminium stator windings.

Preferably, the first threshold is the rotor revolution rate at or above which electronically commutating the motor with two phase firing cannot provide the rated current limit of the electronically commutated motor.

Preferably, using an optimised firing angle comprises the step of setting the firing angle at an angle that substantially maximises current that is in-phase with the back emf of the motor, the current being current that is applied to the motor by electronically commutating the motor with three phase firing.

Optimising the firing angle can also, or alternatively, comprise using an optimised firing angle comprises the step of setting the firing angle at an angle at which the integration of the product of current and back emf of at least one motor phase is substantially maximised, the current being current that is applied to the motor by electronically commutating the motor with three phase firing. This advanced firing angle maximises the absolute maximum torque level at certain speeds, but might reduce efficiency to some degree.

In another aspect the present invention may be said to consist in an electronically commutated motor for using in a washing machine comprising: a rotor, a stator with a plurality of windings forming three stator phases, and an electronic commutator coupled to the three stator phases, wherein the electronic commutator is adapted to detect, or receive a signal indicating, an agitate cycle of the washing machine, and during an agitate cycle: electronically commutate the motor with two phase firing if the agitator is rotating at rate below a first threshold, electronically commutate the motor with three phase firing if the agitator is rotating at rate above a first threshold, wherein to electronically commutate the motor with three phase firing, the electronic commutator is adapted to use an optimised firing angle.

Preferably, electronically commutating the motor with three phase firing comprises operating the three stator phases in a plurality of stages, wherein for each stage the electronic commutator is adapted to: apply an excitation voltage to one of the stator phases, and apply a reference voltage to the other two stator phases.

Preferably, for each stage the electronic commutator is adapted to apply an excitation voltage and reference voltages to different combinations of stator phases.

Preferably, the plurality of windings are aluminium windings.

Preferably, the first threshold is the rotor revolution rate at or above which electronically commutating the motor with two phase firing cannot provide the rated current limit of the electronically commutated motor.

Preferably, to use an optimised firing angle during three phase firing the electronic commutator is adapted to set the firing angle at an angle that substantially maximises current that is in-phase with the back emf of the motor, the current being current that is applied to the motor by the electronic commutator.

Preferably, or alternatively, to use an optimised firing angle during three phase firing the electronic commutator is adapted to set the firing angle at an angle that at which substantially the integration of the product of current and back emf of at least one motor phase is substantially maximised, the current being current that is applied to the motor by electronically commutating the motor with three phase firing. This advanced firing angle maximises the absolute maximum torque level at certain speeds, but might reduce efficiency to some degree.

In another aspect the invention may be said to consist in a washing machine comprising an agitator and an electronically commutated motor for operating the agitator, the motor comprising: a rotor, a stator with a plurality of windings forming three stator phases, and an electronic commutator coupled to the three stator phases, wherein the electronic commutator is adapted to detect, or receive a signal indicating, an agitate cycle of the washing machine, and during an agitate cycle: electronically commutate the motor with two phase firing if the agitator is rotating at rate below a first threshold, electronically commutate the motor with three phase firing if the agitator is rotating at rate above a first threshold, wherein to electronically commutate the motor with three phase firing the electronic commutator is adapted to use an optimised firing angle.

Preferably, electronically commutating the motor with three phase firing comprises operating the three stator phases in a plurality of stages, wherein for each stage the electronic commutator is adapted to: apply an excitation voltage to one of the stator phases, and apply a reference voltage to the other two stator phases.

Preferably, for each stage the electronic commutator is adapted to apply an excitation voltage and reference voltages to different combinations of stator phases.

Preferably, the plurality of windings are aluminium windings.

Preferably, the first threshold is the rotor revolution rate at or above which electronically commutating the motor with two phase firing cannot provide the rated current limit of the electronically commutated motor.

Preferably, to use an optimised firing angle during three phase firing the electronic commutator is adapted to set the firing angle at an angle that substantially maximises current that is in-phase with the back emf of the motor, the current being current that is applied to the motor by the electronic commutator. Preferably, or alternatively, to use an optimised firing angle during three phase firing the electronic commutator is adapted to set the firing angle at an angle at which the integration of the product of current and back emf of at least one motor phase is substantially maximised, the current being current that is applied to the motor by electronically commutating the motor with three phase firing. This advanced firing angle maximises the absolute maximum torque level at certain speeds, but might reduce efficiency to some degree.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of". Related terms such as "comprise" and "comprised" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

Preferred embodiments of the invention will be described with reference to the drawings of which.

DETAILED DESCRIPTION OF PREFERRED EMBODIMENTS

An embodiment of the invention will be described with reference to FIGS. 1a to 10. The preferred embodiment may comprise an electronically commutated motor and its method of operation, and/or a washing machine with such an electronically commutated motor.

Figure 1A:
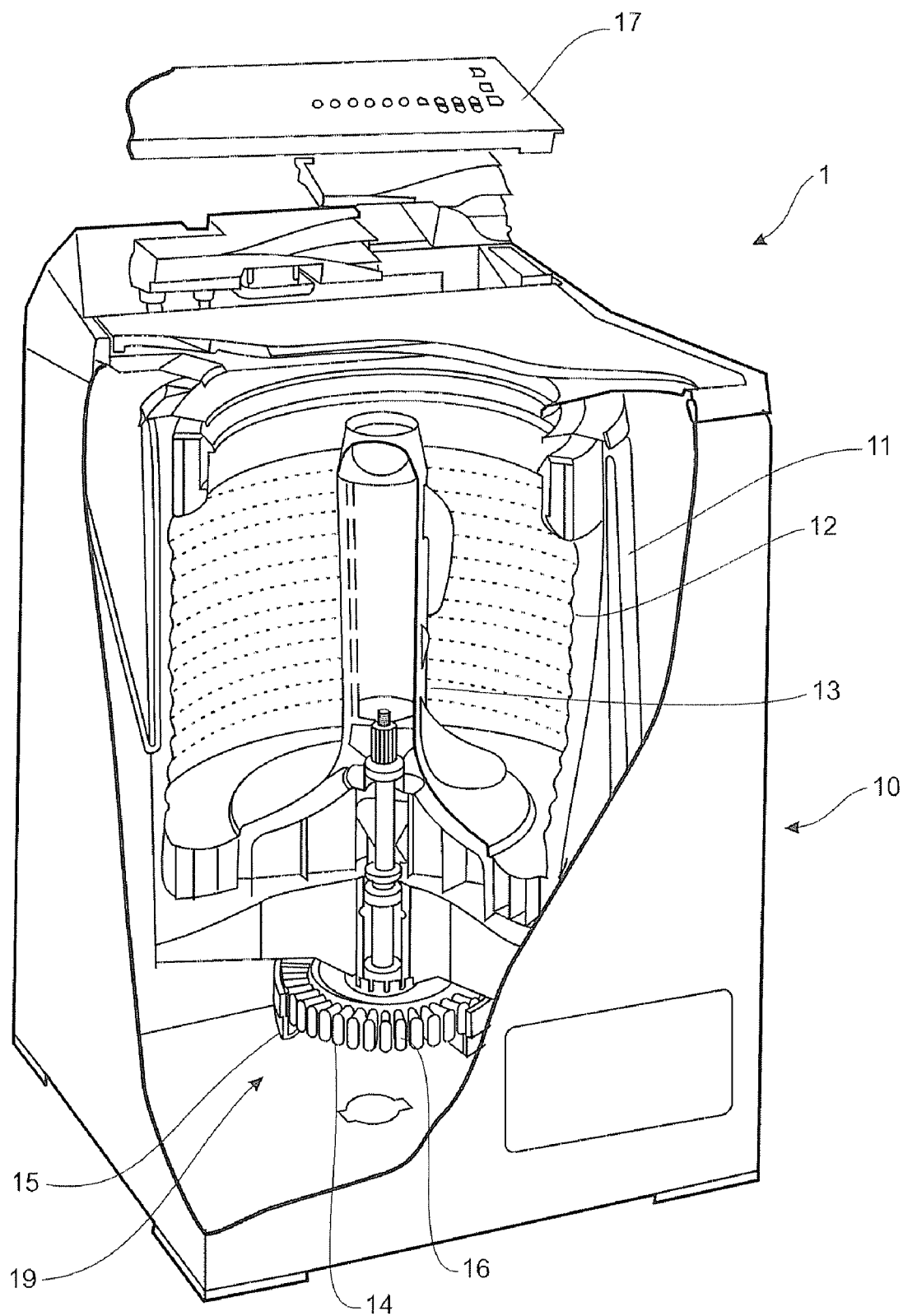
FIG. 1a is a schematic diagram of a washing machine with a cutaway portion showing a central column agitator and electronically commutated motor.
Figure 1B:
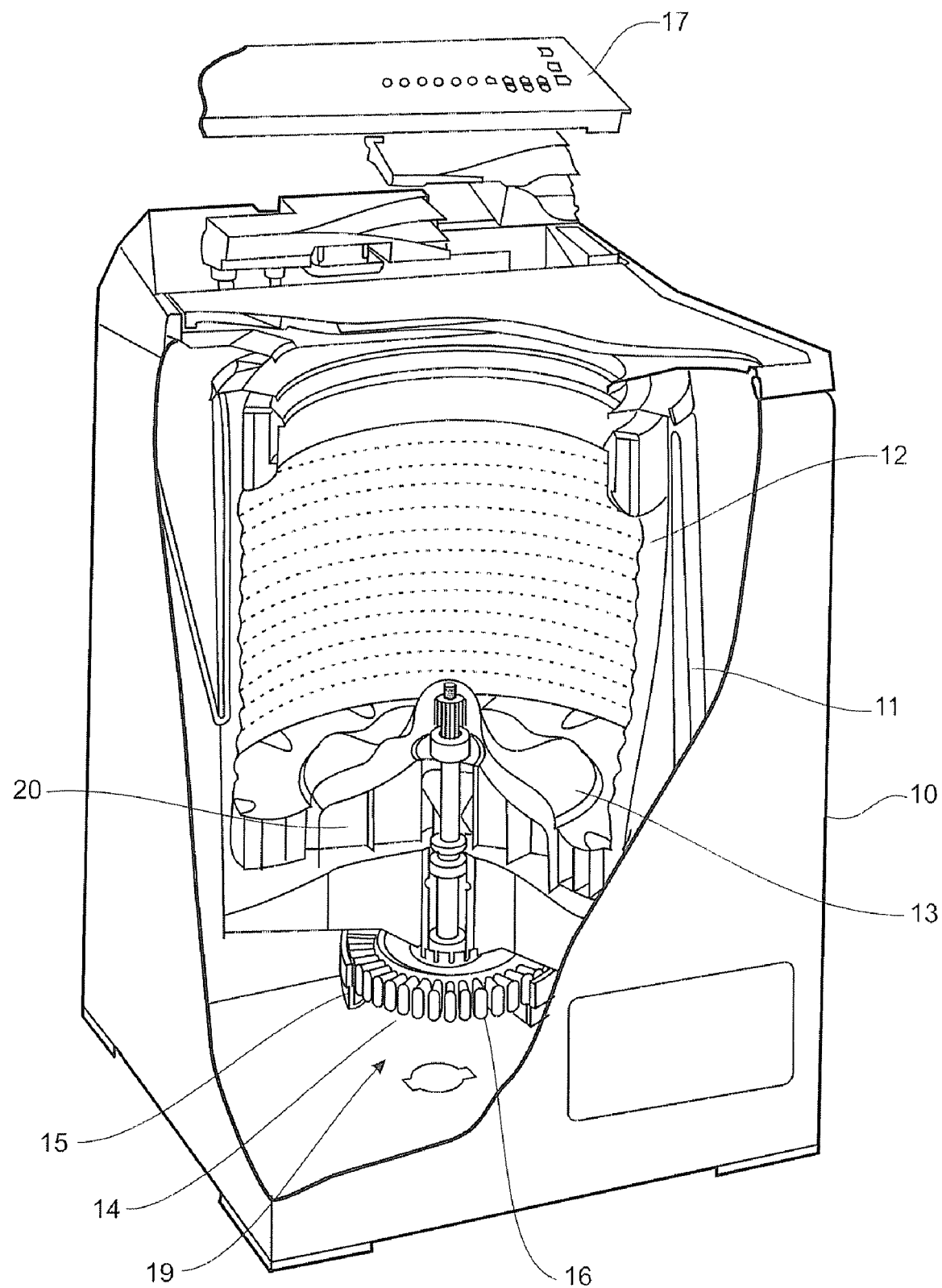
FIG. 1b is a schematic diagram of a washing machine with a cutaway portion showing a low-profile washplate agitator and electronically commutated motor.

Referring to FIG. 1a, a washing machine 1 according to one embodiment of the invention comprises an outer wrapper 10, a tub 11 suspended in the wrapper, a spin basket 12 for holding clothes and an agitator 13 for agitating the clothes to clean them during an agitate cycle. The agitator can take the form of a central column 13 as shown, or alternatively a low-profile washplate 13 as shown in FIG. 1b. An electronically commutated motor 19 is provided to operate the spin basket 12 and agitator 13. It comprises a stator 14 and a rotor 15. The rotor is or can be coupled to the agitator 13 and spin basket 12. The stator 14 comprises a number of poles e.g. 16, each pole comprising a coil or winding wound around a radially extending core or tooth. Each winding can comprise copper or aluminium wire. Every third stator winding is electrically connected to provide three separate phases on the stator 14. These three phases can be energised separately. The washing machine also comprises a control panel 17, with associated controls and electronics for controlling various operations of the washing machine 1. The typical operations comprise a fill cycle, a spin cycle and an agitate cycle, among others. The fill, spin and other cycles will be known to those skilled in the art, and will not be described in detail. FIG. 1b shows a similar washing machine, but with a low-profile washplate 13 as the agitator.

Figure 2:
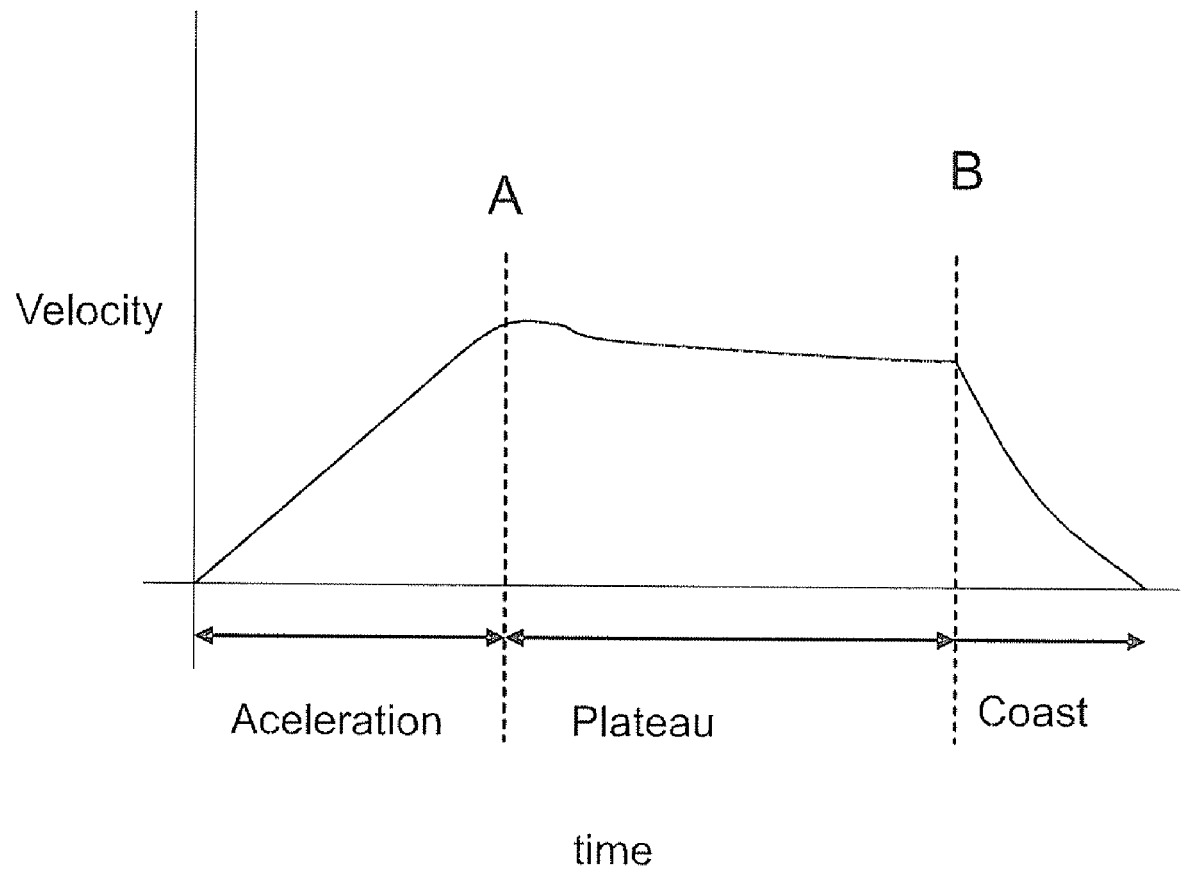
FIG. 2 shows an agitate profile of the washing machine.

The electronically commutated motor 19 can operate the agitator 13 during the agitate cycle of the washing machine in the desired manner. During agitation, the agitator 13 is oscillated in a rotational manner to cause movement of clothes and water to wash clothing in the spin basket 12. A back and forth oscillation comprises one stroke. FIG. 2 shows an example of a typical agitate profile for half a stroke. The half cycle first comprises an acceleration time in which the speed of the agitator is driven from zero to a plateau speed at point A by the motor 19. The term "speed" refers to any measure of the rate of rotation of the agitator 13 during oscillation. Typically, speed will be measured as an rpm (revolutions per minute). The speed of the agitator then settles and is driven at a plateau speed by the motor 19 until point B. The motor 19 is then operated into a coast mode such that the speed of the agitator 13 drops to zero. At this point the agitator 13 is operated in the opposite direction to complete a full stroke using a similar agitate profile.

Figure 3:
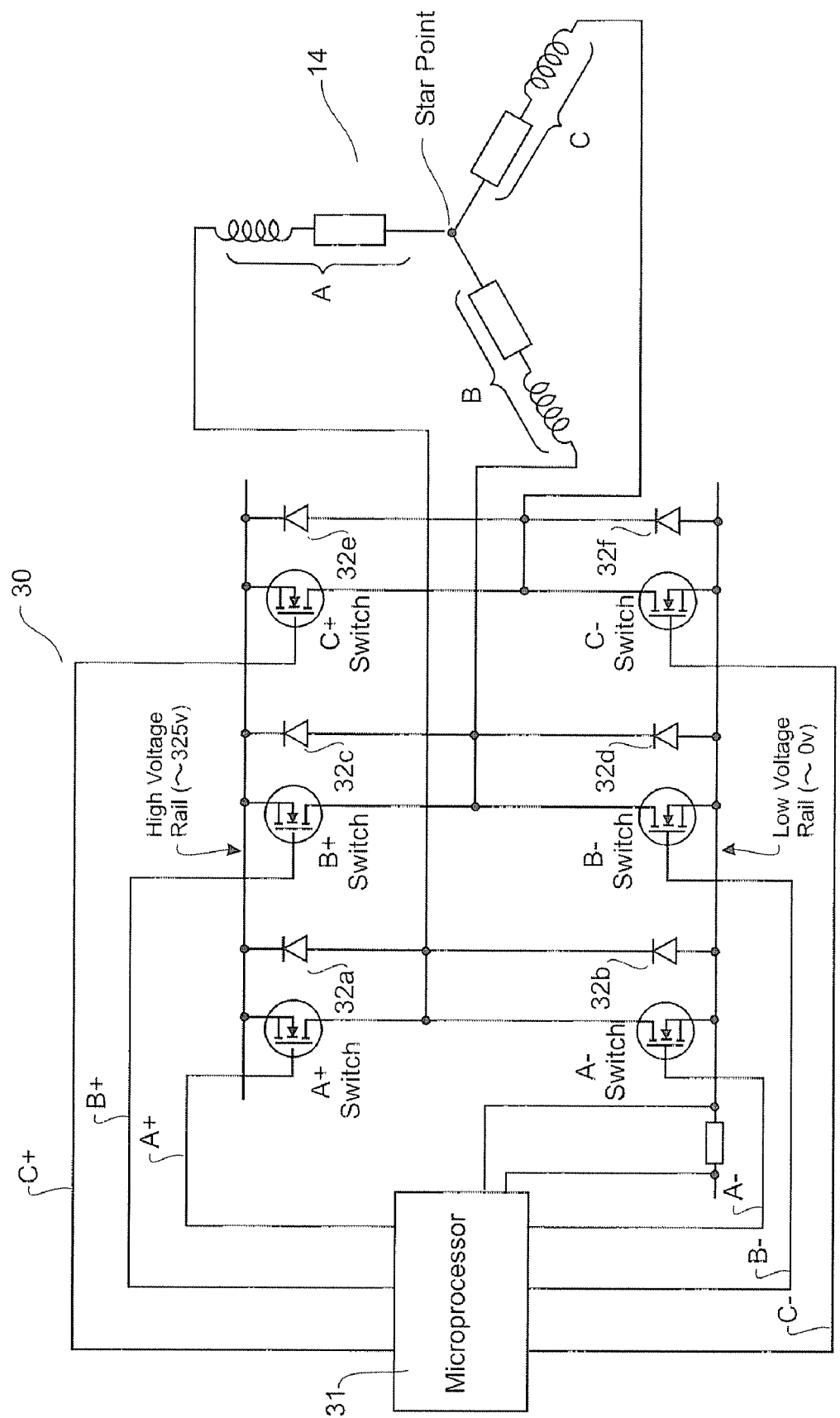
FIG. 3 is a schematic diagram of a stator for the washing machine with an electronic commutator.

The stator 14 and electronic commutator 30 of the motor 19 is shown schematically in FIG. 3. Three stator phases A, B and C are connected at a star point as shown. The electronic commutator 30 is coupled to the three stator phases. The electronic commutator preferably comprises a controller 31, such as a microcontroller or microprocessor, and electronic switching circuitry. The electronic switching circuitry comprises electronic switches A+, B+, C+, A−, B−, C−, which form a switching bridge. Switches A+, B+, C+ provide a connection path for respective stator phases A, B, C to the supply positive rail. Switches A−, B−, C− provide a connection path for respective stator phases A, B, C to the power supply negative rail or 0 volt rail. The six switches are in a totem pole configuration. Free wheel diodes 32a-32f allow currents induced in the stator phase windings A, B, C to be returned to the supply rails in the known way.

The controller 31 can control the switches A+, B+, C+, A−, B−, C− to selectively energise the three stator phases A, B, C as required in to set up a rotating magnetic field in order to rotate the rotor 15 (not shown in FIG. 3). The controller 30 does so by sending a control signal to the gate of a respective switch that it is to control. By controlling the voltages applied to the various stator phases, the speed and direction of the rotor 15 can be controlled. The general operation of the switching circuitry of an electronically commutated motor will be known to those skilled in the art, although it will be briefly described here.

The switches can be operated by the controller 31 to couple any one of the stator phases A, B, C to a fixed, static or constant voltage (generally termed a "reference voltage") or a generated voltage (generally termed an "excitation voltage"). A generated or excitation voltage may be independently generated or alternatively be a pulse width modulated (PWM) voltage. A fixed, static or constant (reference) voltage can be a high or low voltage. For example, the high voltage might be a positive voltage, and a low voltage might be a negative voltage or a zero voltage.

The rest of the specification will refer to the excitation voltage as a "PWM voltage", although it will be appreciated that other types of excitation voltages are possible.

To couple stator phase A to a positive reference voltage, the controller turns on switch A+ and switches off switch A−. This couples the phase to the positive rail. To couple stator phase A to a negative reference voltage, the controller switches off switch A+ and switches on switch A−. This couples the stator phase A to the negative reference voltage. To apply a pulse width modulated (PWM) voltage that is positive, the controller turns off switch A− and intermittently switches the A+ switch on and off. This intermittently couples the stator phase to the high reference voltage, creating a positive PWM voltage. The duty cycle of this PWM voltage determines the magnitude of the PWM voltage. To couple a negative PWM voltage to stator phase A, the controller turns off switch A+ and intermittently turns on switch A−, to intermittently couple the stator phase to the low reference voltage, to create a negative PWM voltage. The stator phases B and C can be coupled to the positive and negative rails in a similar manner, or have a pulse width modulated voltage applied, but by using respective switches B+, B− and C+, C−.

The controller 31 also has inputs to receive information from other parts of the washing machine 1 to detect the various cycles of the washing machine cycle. In particular, it can receive information indicating when the washing machine 1 should be or is in agitate cycle, or it can make this determination from feedback parameters from the motor 19. The controller 31 can also determine the position and speed of the motor by detecting back emf, using hall sensors (not shown) or any other suitable method.

Figure 4:
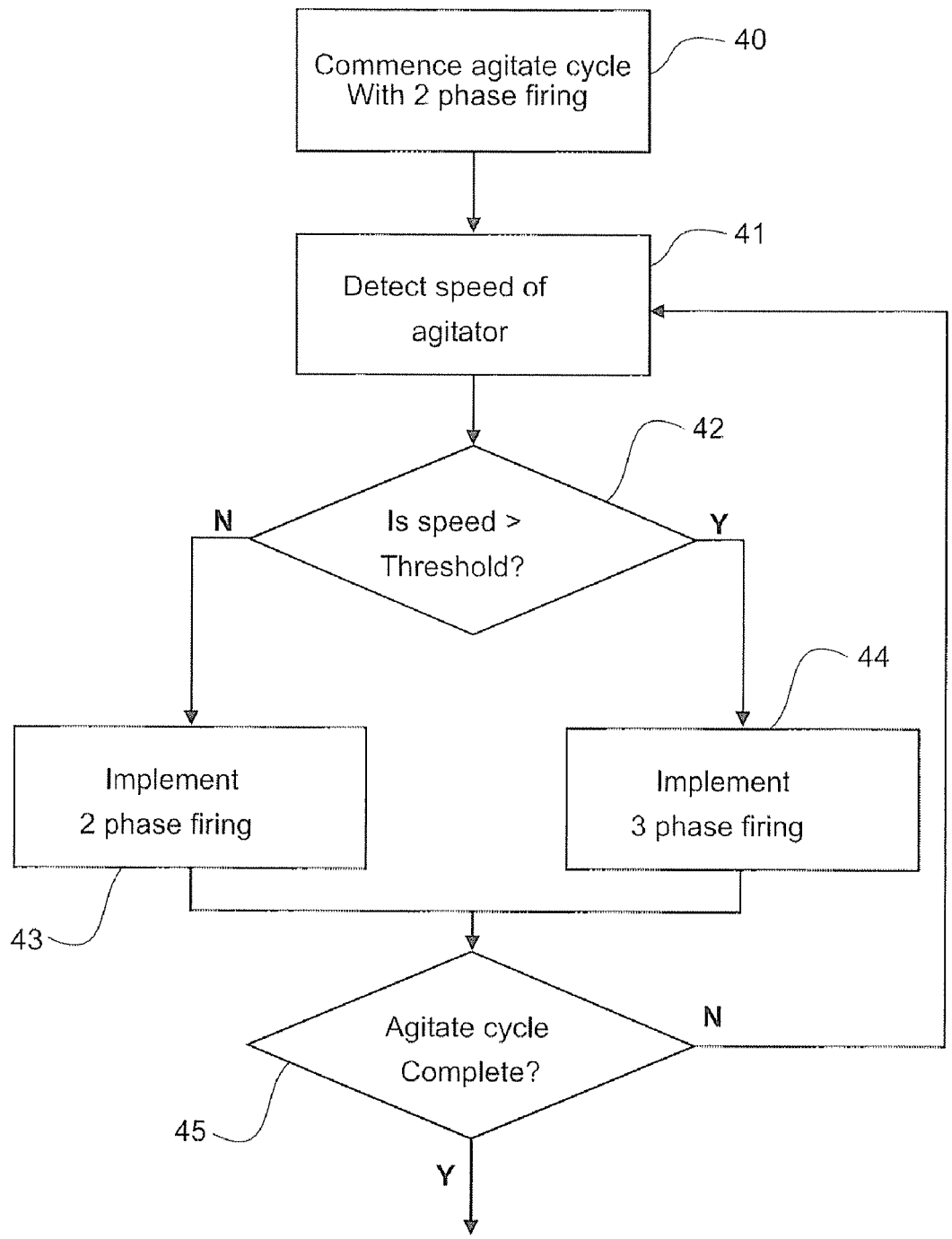
FIG. 4 is a flow chart of the operation of the motor in a washing machine.

A method of operating the electronic commutated motor 19 when used in the washing machine 1 will be described with reference to FIGS. 4-6. The controller 31 is programmed or otherwise adapted to carry out the method. Referring to FIG. 4, the washing machine operates in the usual manner carrying out the usual cycles. The controller 31 detects when an agitate cycle occurs. It might determine this from an external trigger signal generated by another controller of the washing machine, or alternatively the controller 31 itself monitors the stages of the washing machine cycle and generates an internal trigger. When the controller 31 receives a trigger signal indicating that the agitate cycle has commenced, step 40, the controller 31 controls the switching circuitry to operate the rotor 14 in the desired manner to facilitate agitation.

The controller 31 first implements two phase firing, whereby the electronic switches are operated to energise two stator phases at any point in time. The term "energise" refers generally to applying a voltage to a stator, be it an excitation voltage or a reference voltage. During the agitate process, step 41, the controller 31 detects the speed or rpm of the motor 19. It can do this using rotor position detection, using back emf or hall sensors or any other suitable method. The controller 31 then determines if the speed of the rotor 14 is above a predetermined (or optionally a varying) threshold. That is, it checks whether the rotation of the agitator is above a threshold rate. Preferably, the rate of rotation is measured in rpm. The threshold can depend on the threshold rpm beyond which two phase firing no longer reaches the rated current or current limit of the motor. That is, the "knee" of the two phase torque curve. This threshold is motor dependent.

The threshold preferably occurs at the rotor rpm at which the two phase firing can no longer provide the rated current limit of the motor drive electronics. Once this is reached, three phase firing is initiated to provide the additional current. This threshold will differ depending on the nature of the motor, and the threshold can be set as suitable for the motor. For example, VA washer motors are designed to have a knee or rated speed of around 80-150 rpm. Therefore, the range at which three phase firing commences can be set at between 80-150 rpm. In the particular case shown in FIGS. 9 and 10, the threshold was in the range of 75-85 rpm, and more preferably approximately 80 rpm. The values are exemplary only, and should not be considered limiting.

Typically rpm is used as the measure for determining the rate at which the agitator is rotating. However, alternatively velocity could be used to determine the rate at which the motor is rotating, or any other suitable measure. The remainder of the description will refer to rpm as the rate of rotating of the agitator 13, but this should not be considered limiting.

If the detected rpm of the agitator is below the threshold, step 42, the controller continues to operate the electronic switches to continue implementation of two phase firing of the agitator, step 43. Alternatively, if the controller 31 detects that the rpm of the agitator 13 is above the threshold, the controller 31 then reverts to a second programme, whereby the electronic switches are operated to implement three phase firing of the three stator phases, step 44. In three phase firing, all three phases are energised at any time. The controller continues to detect the rpm while agitation is in progress steps 45, 41 to determine whether it should implement two phase or three phase firing of the stator phases. If the agitation cycle has completed, step 45, then the controller 31 ceases this part of the programme and continues to control the circuitry to operate the motor 19 in another manner suitable for the washing cycle that the washing machine 1 is about to commence.

In general, two phase firing comprises applying or coupling a pulse width modulated voltage to one of the stator phases, which comprises intermittently operating the required switches to couple the stator phase intermittently to a voltage rail. Two phase firing further comprises coupling another of the phases to either a high reference voltage or a low reference voltage by operating the electronic switches coupled to that phase. Typically, this is done by operating the switches to couple the phase to a high voltage rail or a low voltage rail, which might be 0 volts or negative. Finally, the electronic switches are operated to leave a third stator phase floating. This is done by opening the electronic switches connected to the phase in order to decouple that phase from the voltage rails or an energising voltage.

The two phase firing occurs in a number of stages, whereby in each stage the controller 31 operates the switches to energise a different combination of the phases. That is, the controller 31 alters which phase receives a pulse width modulated voltage, which phase is coupled to the reference voltage and which phase is left floating. Preferably there are six stages, wherein each stage relates to 60 degrees of a rotor rotation.

In three phase firing a different operation takes place. The controller 31 operates the electronic switches to apply a pulse width modulated voltage to a first phase. The controller then operates the electronic switches to couple the other two phases to a reference voltage. This reduces switching losses and improves phase current waveform shape compared to the more conventional method of two phase PWM firing. Again, there are preferably six stages, whereby the controller operates the switches at each stage to alter the combination of which phases are connected to apply a pulse width modulated voltage and which are coupled to a reference voltage.

In an alternative embodiment, two conditions are met before three phase firing commences. First, the rate of rotation of the agitator must be above a first threshold, as noted early. Second, the pulse width modulated duty cycle must be higher than a second threshold. This can be set at any suitable ratio, for example greater than 50%.

Figure 5:
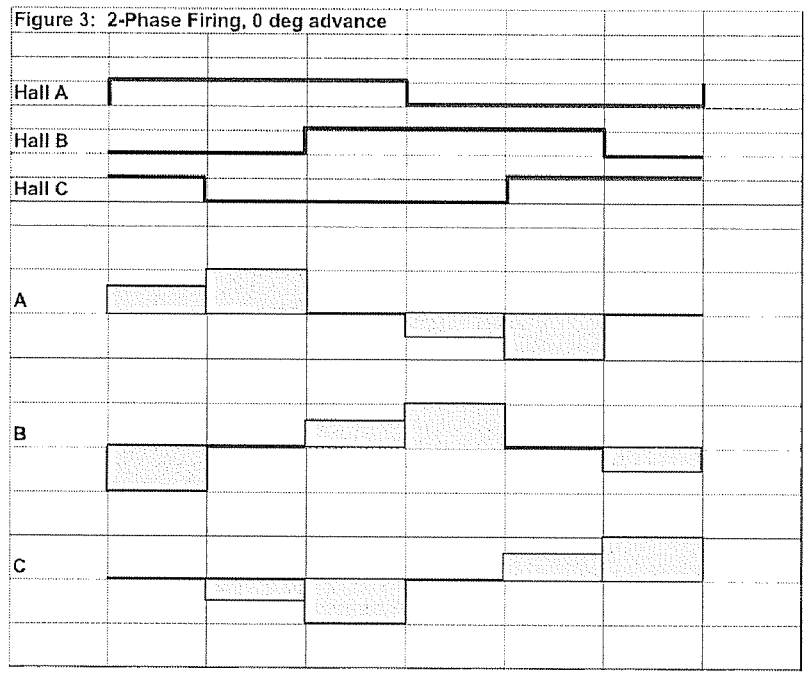
FIG. 5 is a schematic diagram of a firing sequence for two phase operation of the motor.

FIG. 5 shows one possible implementation of two phase firing implemented by the controller. FIG. 5 shows the six stages of the firing process. For each stage it shows the back emf in each respective stator phase, which can be detected by a hall sensor or any other suitable method. It also shows the applied voltage to each phase, which can be a) a PWM voltage, b) a no applied voltage, that is a floating voltage whereby the phase is decoupled from the voltage rails or c) reference voltage. At each stage, the phase angle (firing angle) between the back emf (as shown by the hall sensor waveform) and the PWM voltage is 0 degrees relative to the leading edge, or 30 degrees advanced relative to the centre of the waveforms. In the first stage, the controller 31 controls the switching to couple a positive PWM voltage to phase A, couple phase B to a negative reference voltage, and decouples phase C to retain it in the floating state. In stage 2, the controller couples stator phase A to a positive reference voltage, decouples stator phase B to retain it floating, and couples stator phase C to a negative PWM voltage. In stage 3, the controller decouples stator phase A to leave it floating, couples stator phase B to a positive PWM voltage and couples stator phase C to a negative reference voltage. In stage 4, the controller couples the stator phase A to a negative PWM voltage, stator phase B to a positive reference voltage and decouples stator phase C to retain it floating. In stage 5, the controller couples stator phase A to a negative reference voltage, decouples stator phase B to retain it floating and couples stator phase C to a positive PWM voltage. In stage 6, the controller decouples stator phase A to retain it floating, couples stator phase B to a negative PWM voltage and couples stator phase C to a positive reference voltage.

It will be appreciated that FIG. 5 just shows one possible programme for two phase firing of the stator phases, and other programmes are possible whereby two phase firing occurs but with different combinations of the phases being energised.

Figure 6:
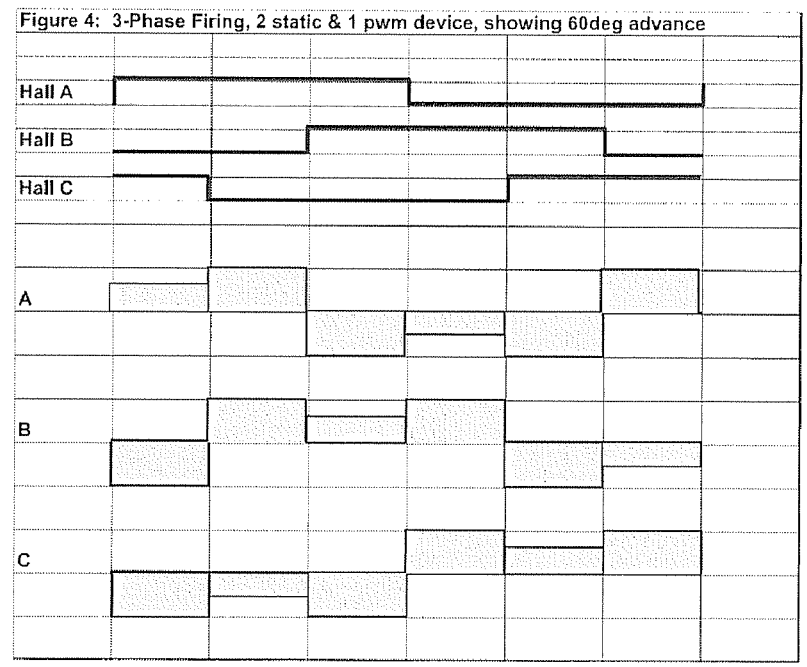
FIG. 6 is a schematic diagram of a firing sequence for a three phase operation mode of the motor.

FIG. 6 shows the manner in which the controller 31 operates the electronic switches to implement three phase firing of the motor. For each stage FIG. 6 shows the back emf in each respective stator phase, which can be detected by a hall sensor or any other suitable method. In each phase, one phase is applied or coupled to a pulse width modulated voltage, while the other two phases are connected to the same high or low reference voltage. The switches can be controlled to implement a particular firing angle for each phase, which results in or controls the phase angle between the current and back emf for that phase. The switches are controlled to implement a firing angle by software in the controller.

The electronic commutator uses an optimised firing angle (which is or results in an optimised phase angle). The optimised firing angle is a firing angle at which the motor torque to current ratio (Nm/A) is substantially maximised. Firing angle typically refers to the angle between the excitation (e.g. PWM voltage) relative to the back emf. Alternatively, the optimised firing angle is a firing angle at which the motor torque is substantially maximised. Substantially maximised generally means maximised as much as possible, or maximised to a sufficient degree to provide beneficial operation. Alternatively, the optimised firing angle could be a firing angle at which a suitable compromise is made between substantially maximising motor torque to current ratio and substantially maximising torque.

Figure 8:
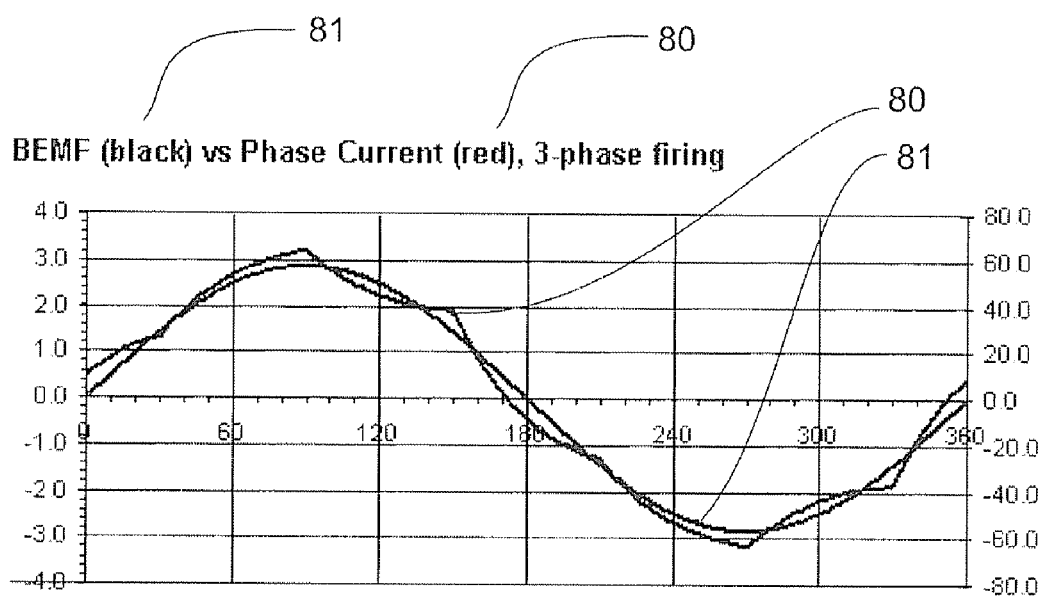
FIG. 8 is a graph of the current and the back emf for three phase firing.

In order to substantially maximise the torque to current ratio, the optimised firing angle depends on the motor electrical characteristics, particularly inductance, resistance, and back emf. The firing angle might be fixed to an optimised angle for a particular motor. Referring to FIG. 8, the optimised firing angle for maximising the torque to current ratio is an angle that substantially maximises the current that is in-phase with the back emf. Therefore, to use an optimised firing angle, the electronic commutator is adapted to set the firing angle at an angle that substantially maximises current that is in-phase with the back emf of the motor. Substantially maximised generally means maximised as much as possible, or maximised to a sufficient degree to provide beneficial operation. In one embodiment, the firing angle between the back emf and PWM voltage is software controlled to preferably between 30 and 50 degrees advanced, although other values outside this range are possible.

Alternatively, or in addition to the above optimisation, in order to substantially maximise the torque, the firing angle is set at an advanced angle such that the current leads the back emf by a predetermined amount (fixed or variable). This substantially maximises the absolute torque level, at the expense of reduced torque to current ratio (Nm/A). To optimise for maximum torque, the optimised firing angle is determined by integrating the product of current and back emf over one or more whole sinusoidal oscillations of at least one motor phase. The optimised firing angle is the angle at which this integration product is maximised. Therefore, to use an optimised firing angle that substantially maximises torque, the electronic commutator is adapted to set the firing angle at an angle at which the integration of the product of current and back emf of at least one motor phase is substantially maximised. Substantially maximised generally means maximised as much as possible, or maximised to a sufficient degree to provide beneficial operation. As there are three phases, preferably the product for each phase would be integrated as above, and then added together to determine the maximum integration product. However, if the firing angle and motor characteristics are the same for all phases, then calculation of the integration product for one phase will provide sufficient information for determining the optimised firing angle.

Figure 9:
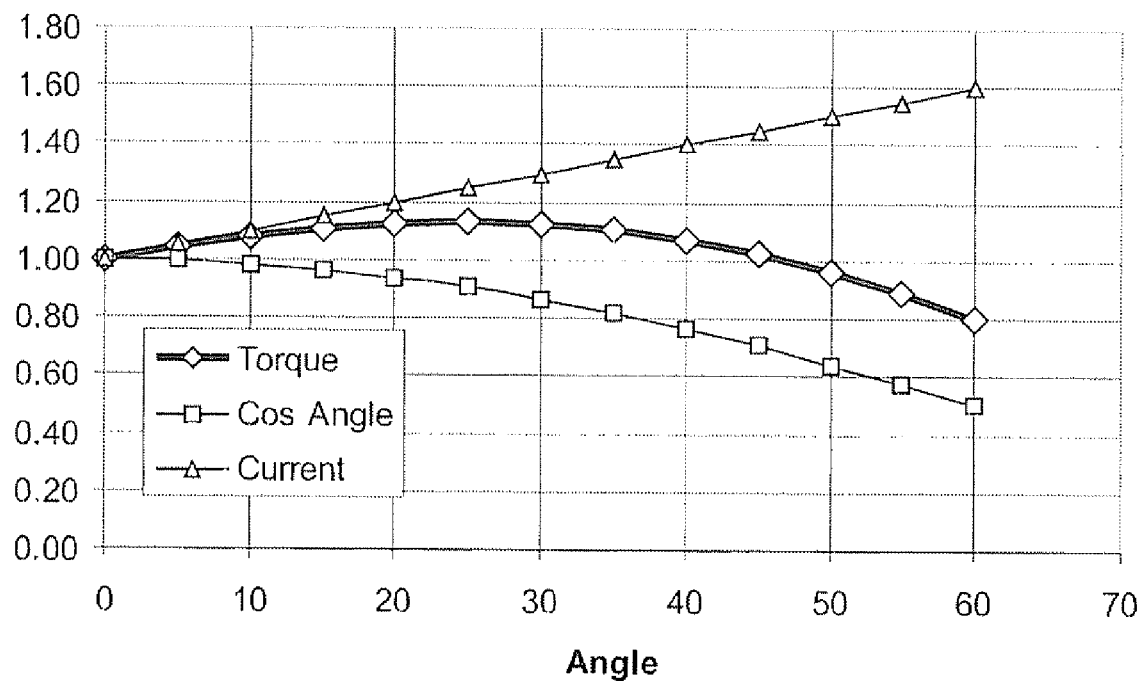
FIG. 9 is a graph of torque, cos A and current vs angle for demonstrating the point of maximised torque.

FIG. 9 illustrates the optimised angle for maximised torque in more detail. It is a graph of torque, cos angle and current vs angle. It can be explained mathematically as follows:

If you assume sinusoidal current and back emf waveforms then:

$$T = I * E \cos A$$

Where T=torque produced, I=motor current (RMS), E=back emf (rms), A=phase angle between current and back emf waveforms.

As seen in FIG. 9, as the angle (A) increases, the RMS motor current increases fairly linearly, as it moves out of phase with the emf which is resisting the rise of current. At the same time, the "cos A" term is decreasing in a sinusoidal fashion. The resultant multiplication (i.e. torque) therefore initially increases, until the cos A component starts to decrease more rapidly, after which the torque starts to decrease again. As can be seen, the maximum torque occurs when the "I*cos A" result is maximised, which is not necessarily when A=0. The optimized firing angle is speed and motor characteristic dependent and can be determined by simulation or real-world experimentation.

Figure 7:
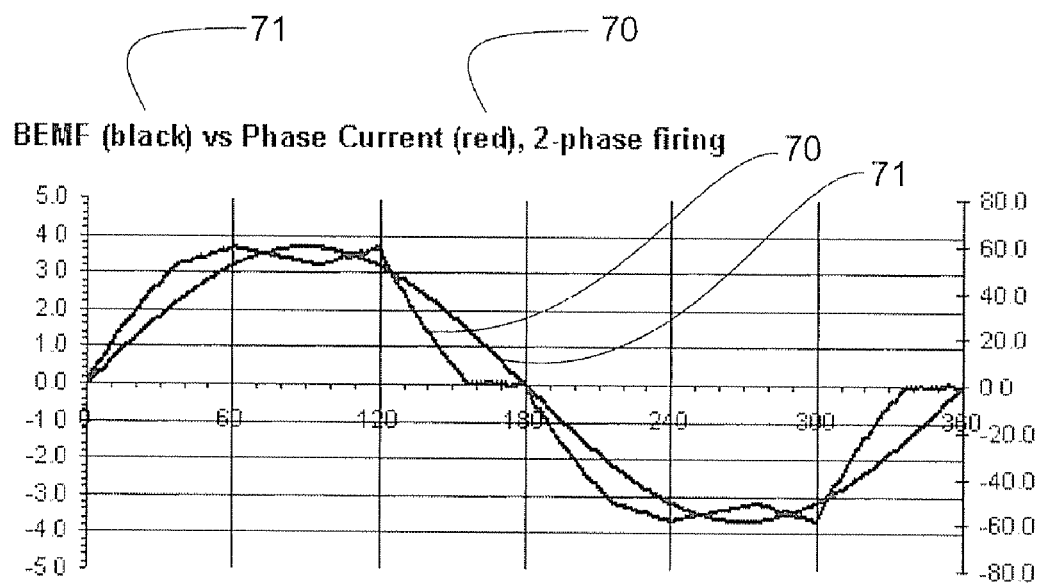
FIG. 7 is a graph of the current and the back emf for two phase firing.

Using an optimised angle improves the torque and/or the torque to current ratio (Nm/A) provided by the motor, depending on which optimisation is used. This can be determined by comparing the applied current with respect to the back emf. FIGS. 7 and 8 show measured current vs back emf for two phase and three phase firing respectively. It can be seen in FIG. 8 that the current 80 in the optimised three phase firing is more closely aligned with the phase of the back emf 81. In FIG. 7, it can be seen that the current 70 during two phase firing is not as closely aligned with the phase of the back emf 71. As the three phase firing current is more in-phase with the back emf, the back emf is utilised more efficiently, thus maximising the torque to current ratio (Nm/A) as much as possible. For example, if the preferred motor is operated at 140 rpm, then two phase firing provides 20.7 Nm at 1.82 Arms, therefore 11.36 Nm/A. Under the same conditions, three phase firing using a firing angle of 40 degrees provides 23.9 Nm at 2.02 Arms, therefore 11.85 Nm/A. This firing angle results in the current being substantially in phase with the back emf, therefore substantially maximising the Nm/A result. Three phase firing using a firing angle of 55 degrees provides 25.8 Nm at 2.29 Arms, therefore 11.24 Nm/A. Therefore maximum torque has been increased at the expense of reduced efficiency (Nm/A). The firing angle required to maximise torque can be experimentally determined, and is dependent on motor characteristics and operating speed.

For simplicity, FIG. 6 shows the application of energisation voltages (i.e. PWM voltages and reference voltages) as 60 degrees advanced. It will be appreciated that altering the advance requires a relative shifting of the shown energisation voltages relative to the detected back emf voltages.

In stage 1 of three phase firing shown in FIG. 6, the controller couples stator phase A to a positive PWM voltage and couples stator phases B and C to a negative reference voltage.

In stage 2, the controller couples stator phases A and B to a positive reference voltage, and couples stator phase C to a negative PWM voltage. In stage 3, the controller couples stator phases A and C to a negative reference voltage and couples stator phase B to a positive PWM voltage. In stage 4, the controller couples stator phase A to a negative PWM voltage and couples stator phases B and C to a high reference voltage. In stage 5, the controller couples stator phases A and B to a negative reference voltage and couples stator phase C to a positive PWM voltage. In stage 6, the controller couples stator phases A and C to a positive reference voltage and stator phase B to a negative PWM voltage.

It will be appreciated that FIG. 6 just shows one possible programme for three phase firing of the stator phases, and other programmes are possible whereby three phase firing occurs but with different combinations of the phases being energised.

Figure 10:
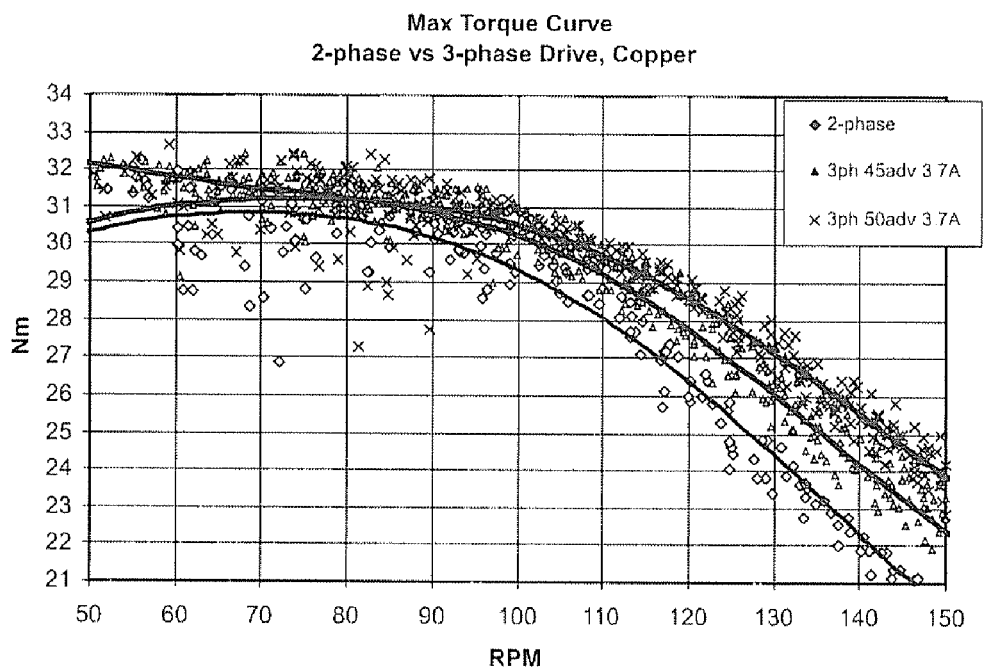
FIG. 10 is a graph comparing torque characteristics for two phase and three phase firing of a motor with copper windings.
Figure 11:
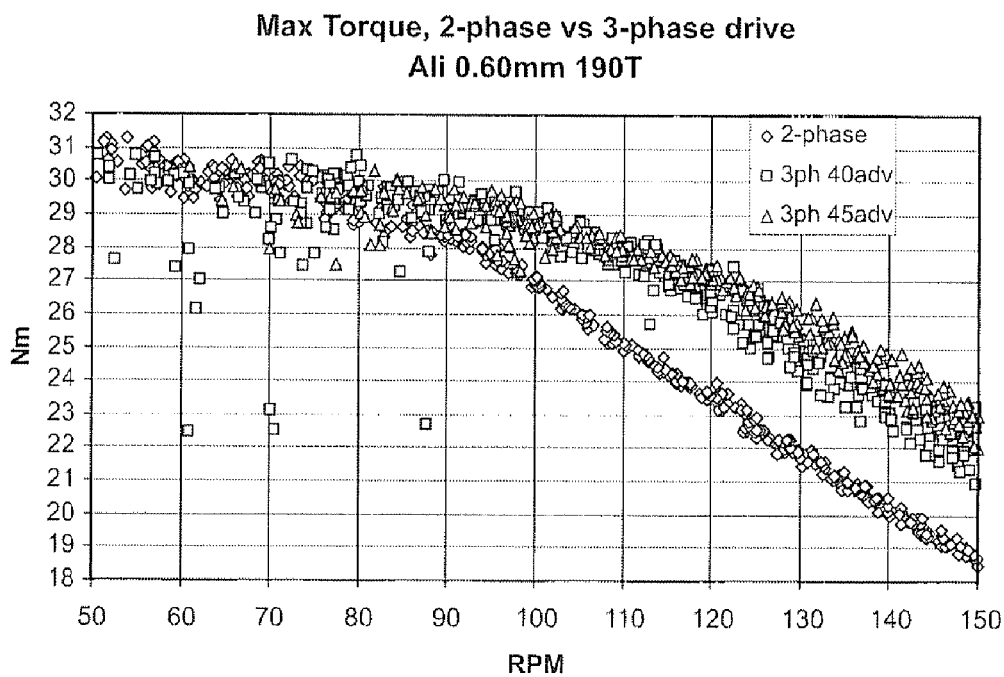
FIG. 11 is a graph comparing torque characteristics for two phase and three phase firing of a motor with aluminium windings.

FIGS. 10 and 11 show the improvement provided by three phase firing when used at agitator speeds above 80 rpm. FIG. 10 shows a dynamometer maximum torque (in Nm) comparison between two phase firing and three phase firing using two different three phase firing advance angles for a copper wound stator at various rpm. The advance angles are 45 degrees and 50 degrees. The graph demonstrates that by switching to three phase firing above 80 rpm can provide 5-15% more torque when operating at 90-150 rpm. The higher the speed, the greater the advantage.

FIG. 11 shows the same comparison, but using an aluminium wound stator. The advance angles for three phase firing are 40 and 45 degrees. As can be seen, by switching to three phase firing after 80 rpm there is a significant increase in torque. The maximum torque in this case can be as much as 20% greater than when using two phase firing at speeds above 80 rpm. The optimum firing angle is lower for an aluminium winding compared with a copper winding, because the motor time constant (L/R) is lower, in turn due to the increased resistance of aluminium wire.

Increasing the torque using the motor 19 and method according to the invention in a washing machine 1 increases the torque available. If three phase firing is not used in this manner, the current limit cannot be reached and therefore the target speed will not be reached. This can reduce wash performance. The invention also allows the use of aluminium winding stators which are cheaper, but do not perform as well in existing motors and using existing firing schemes. The resistance of aluminium windings in conventional firing patterns exaggerates the issue with the lack of drive current/voltage. The problems occur at lower rpm than for copper windings in conventional firing patterns.

While preferred embodiments of the present invention are shown and described, it is envisioned that those skilled in the art may devise various modifications of the present invention without departing from the spirit and scope of the appended claims.

The invention claimed is:

1. A method of operating a washing machine with an agitator operated by an electronically commutated motor comprising three stator phases, the method comprising the steps of:
   detecting an agitate cycle of the washing machine, and during an agitate cycle:
      electronically commutating the motor with two phase firing if the agitator is rotating at rate below a first threshold,
      electronically commutating the motor with three phase firing if the agitator is rotating at rate above the first threshold, wherein the step of electronically commutating the motor with three phase firing comprises using an optimised firing angle and comprises operating the three stator phases in a plurality of stages, each stage comprising the steps of applying an excitation voltage to one of the stator phases, and applying a reference voltage to the other two stator phases.

2. A method according to claim 1 wherein for each stage an excitation voltage and reference voltages are applied to different combinations of stator phases.

3. A method according to claim 1 wherein the electronically commutated motor comprises aluminium stator windings.

4. A method according claim 1 wherein the first threshold is the rotor revolution rate at or above which electronically commutating the motor with two phase firing cannot provide the rated current limit of the electronically commutated motor.

5. A method according to claim 1 wherein using an optimised firing angle comprises the step of setting the firing angle at an angle that substantially maximises current that is in-phase with the back emf of the motor, the current being current that is applied to the motor by electronically commutating the motor with three phase firing.

6. A method according to claim 1 wherein using an optimised firing angle comprises the step of setting the firing angle at an angle at which the integration of the product of current and back emf of at least one motor phase is substantially maximised, the current being current that is applied to the motor by electronically commutating the motor with three phase firing.

7. An electronically commutated motor for using in a washing machine comprising:
a rotor,
a stator with a plurality of windings forming three stator phases, and
an electronic commutator coupled to the three stator phases,
wherein the electronic commutator is adapted to detect, or receive a signal indicating, an agitate cycle of the washing machine, and during an agitate cycle:
electronically commutate the motor with two phase firing if the agitator is rotating at rate below a first threshold,
electronically commutate the motor with three phase firing if the agitator is rotating at rate above the first threshold,
wherein to electronically commutate the motor with three phase firing, the electronic commutator is adapted to use an optimised firing angle and comprises operating the three stator phases in a plurality of stages, wherein for each stage the electronic commutator is adapted to apply an excitation voltage to one of the stator phases, and apply a reference voltage to the other two stator phases.

8. An electronically commutated motor according to claim 7 wherein for each stage the electronic commutator is adapted to apply an excitation voltage and reference voltages to different combinations of stator phases.

9. An electronically commutated motor according to claim 7 wherein the plurality of windings are aluminium windings.

10. An electronically commutated motor according to claim 7 wherein the first threshold is the rotor revolution rate at or above which electronically commutating the motor with two phase firing cannot provide the rated current limit of the electronically commutated motor.

11. An electronically commutated motor according to claim 7 wherein to use an optimised firing angle during three phase firing the electronic commutator is adapted to set the firing angle at an angle that substantially maximises current that is in-phase with the back emf of the motor, the current being current that is applied to the motor by the electronic commutator.

12. An electronically commutated motor according to claim 7 wherein to use an optimised firing angle during three phase firing the electronic commutator is adapted to set the firing angle at an angle at which the integration of the product of current and back emf of at least one motor phase is substantially maximised, the current being current that is applied to the motor by electronically commutating the motor with three phase firing.

13. A washing machine comprising an agitator and an electronically commutated motor for operating the agitator, the motor comprising:
a rotor,
a stator with a plurality of windings forming three stator phases, and
an electronic commutator coupled to the three stator phases,
wherein the electronic commutator is adapted to detect, or receive a signal indicating, an agitate cycle of the washing machine, and during an agitate cycle:
electronically commutate the motor with two phase firing if the agitator is rotating at rate below a first threshold,
electronically commutate the motor with three phase firing if the agitator is rotating at rate above the first threshold,
wherein to electronically commutate the motor with three phase firing the electronic commutator is adapted to use an optimised firing angle and comprises operating the three stator phases in a plurality of stages, wherein for each stage the electronic commutator is adapted to apply an excitation voltage to one of the stator phases, and apply a reference voltage to the other two stator phases.

14. A washing machine according to claim 13 wherein for each stage the electronic commutator is adapted to apply an excitation voltage and reference voltages to different combinations of stator phases.

15. A washing machine according to claim 13 wherein the plurality of windings are aluminium windings.

16. A washing machine according to claim 13 wherein the first threshold is the rotor revolution rate at or above which electronically commutating the motor with two phase firing cannot provide the rated current limit of the electronically commutated motor.

17. A washing machine according to claim 13 wherein to use an optimised firing angle during three phase firing the electronic commutator is adapted to set the firing angle at an angle that substantially maximises current that is in-phase with the back emf of the motor, the current being current that is applied to the motor by the electronic commutator.

18. A washing machine according to claim 13 wherein to use an optimised firing angle during three phase firing the electronic commutator is adapted to set the firing angle at an angle at which the integration of the product of current and back emf of at least one motor phase is substantially maximised, the current being current that is applied to the motor by electronically commutating the motor with three phase firing.

* * * * *